United States Patent
Ansley et al.

(10) Patent No.: US 6,707,603 B2
(45) Date of Patent: Mar. 16, 2004

(54) APPARATUS AND METHOD TO DISTORT AN OPTICAL BEAM TO AVOID IONIZATION AT AN INTERMEDIATE FOCUS

(75) Inventors: David A. Ansley, Long Beach, CA (US); Chungte W. Chen, Irvine, CA (US); Robert W. Byren, Hermosa, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 09/893,922

(22) Filed: Jun. 28, 2001

(65) Prior Publication Data

US 2003/0002177 A1 Jan. 2, 2003

(51) Int. Cl.[7] ................ G02B 17/00; G02B 21/00; G02B 23/00
(52) U.S. Cl. ................ 359/366; 359/729; 359/859
(58) Field of Search .............. 359/364, 365, 359/366, 726, 727, 728, 729, 730, 731, 857, 858, 859

(56) References Cited

U.S. PATENT DOCUMENTS

| | | | | |
|---|---|---|---|---|
| 4,976,520 A | | 12/1990 | Brandstetter et al. | |
| 5,113,284 A | * | 5/1992 | Stuhlinger | 359/419 |
| 5,151,722 A | * | 9/1992 | Massof et al. | 351/158 |
| 5,257,133 A | * | 10/1993 | Chen | 359/565 |
| 5,406,412 A | * | 4/1995 | Zehnpfennig et al. | 359/399 |
| 5,420,436 A | | 5/1995 | Hidaka et al. | |
| 5,550,672 A | * | 8/1996 | Cook | 359/365 |
| 5,946,143 A | | 8/1999 | Whalen | |
| 6,229,649 B1 | | 5/2001 | Jack et al. | |
| 2002/0118457 A1 | * | 8/2002 | Dowski | 359/558 |
| 2002/0154398 A1 | * | 10/2002 | Wolleschensky et al. | 359/385 |

* cited by examiner

Primary Examiner—Mark A. Robinson
(74) Attorney, Agent, or Firm—John E. Gunther; Colin M. Raufer; Glenn H. Lenzen, Jr.

(57) ABSTRACT

An optical system has a light source of an optical beam, and a wavefront distortion generator that introduces a known wavefront distortion into at least one wavelength component of the optical beam prior to the formation of an intermediate image. A focusing device receives the optical beam, produces the intermediate image of the optical beam, and outputs the optical beam. A wavefront distortion corrector, after the formation of the intermediate image, introduces a wavefront distortion correction into each component of the optical beam into which the known wavefront distortion was introduced by the wavefront distortion generator. The wavefront distortion correction is the reverse of the known wavefront distortion introduced into the optical beam by the wavefront distortion generator.

16 Claims, 4 Drawing Sheets

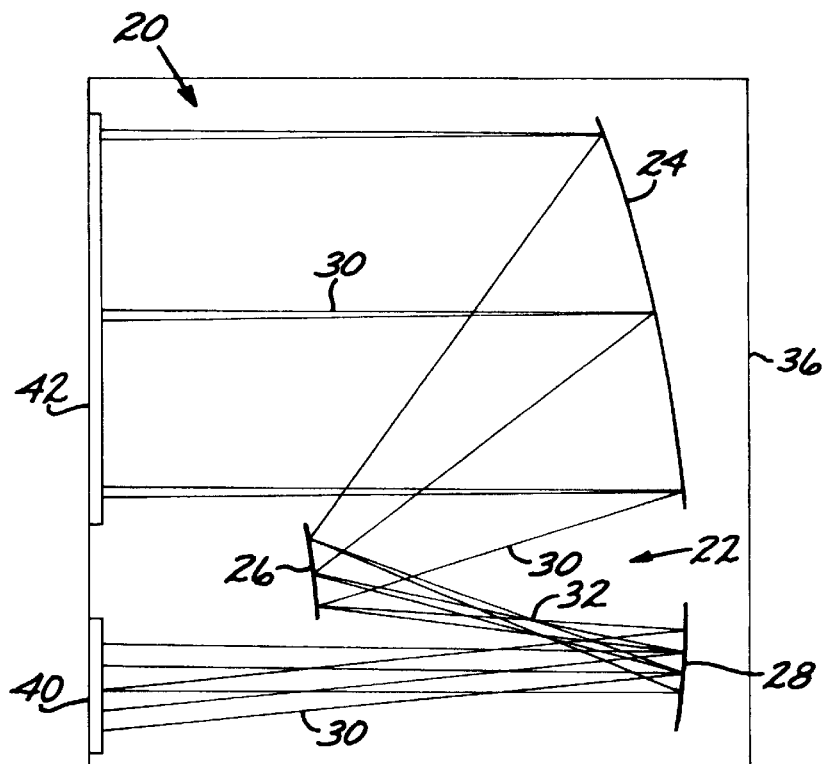
FIG. 1
PRIOR ART
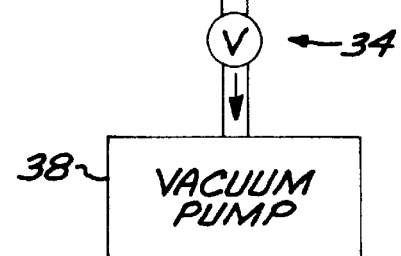
FIG. 2
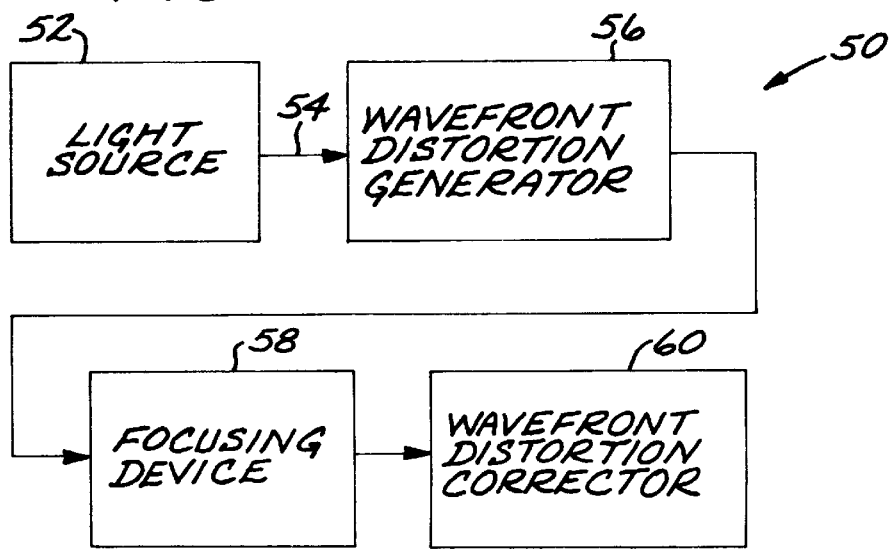

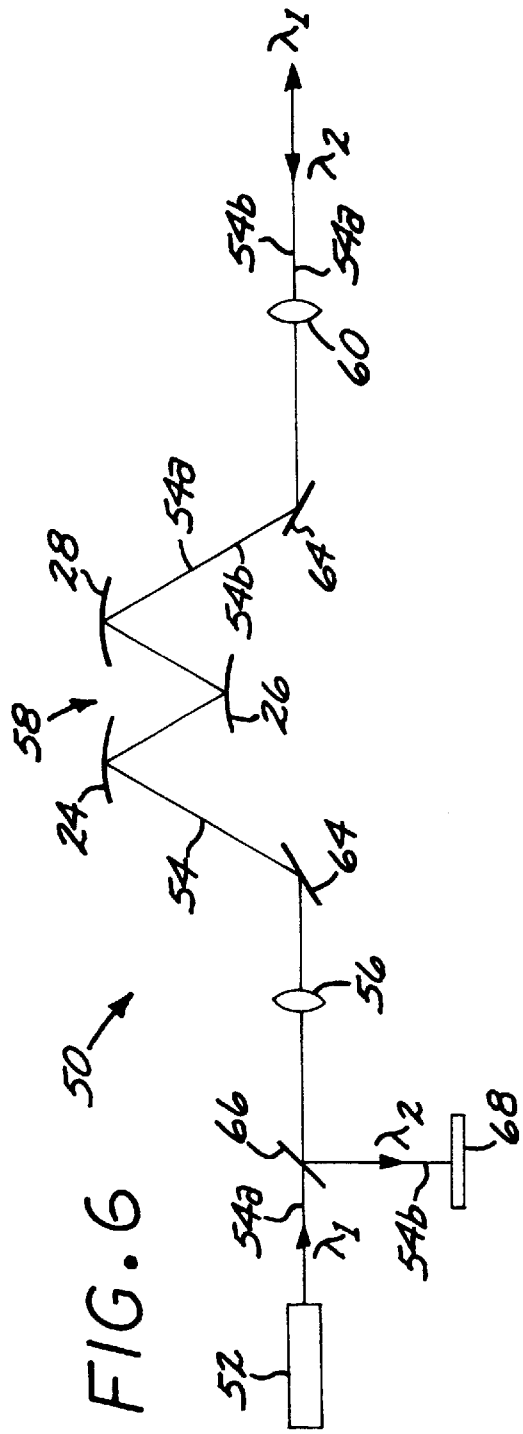
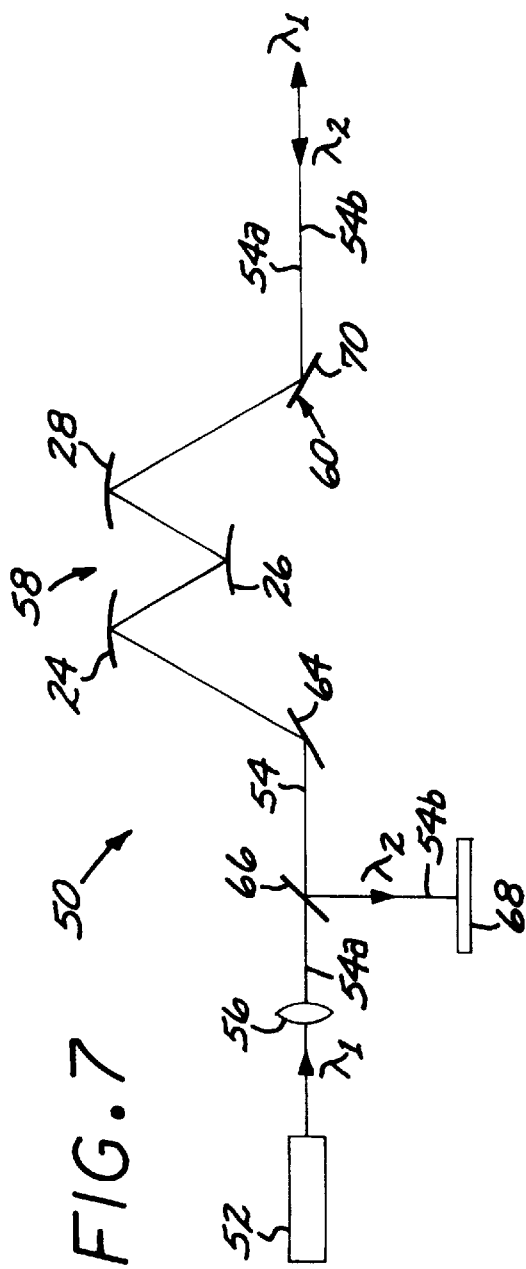

APPARATUS AND METHOD TO DISTORT AN OPTICAL BEAM TO AVOID IONIZATION AT AN INTERMEDIATE FOCUS This invention relates to optical systems and, more particularly, to high-power optical systems that include an intermediate focus of the optical beam.

BACKGROUND OF THE INVENTION

In many optical systems, the optical beam is focused by the optical elements to an intermediate image at a location within the optical system. When the optical beam is a low-power beam, that intermediate focus poses no problem. However, when the optical beam is a high-power beam, the intermediate focus may have such a high optical power density that the air in the vicinity of the intermediate focus is ionized. The ionization of the air through which the optical beam passes distorts the ionizing optical beam, as well as other optical beams that pass through the intermediate focus, in an uncontrolled manner.

The ionization adversely affects the imaging of the optical beam. High-power optical beams are not normally imaged, but in some cases the optical beam includes both a high-power wavelength component that is not imaged, and a low-power wavelength component that is imaged. An example is a laser designator, in which a high-power designator beam at a first wavelength is propagated in one direction along the optical path from a source within the optical system to an external target, and a lower-power imaging beam at a second wavelength is propagated in the opposite direction along the optical path to a sensor within the optical system. If the optical system involves an intermediate focus, the ionization produced by the high-power optical beam at the intermediate focus results in a wavefront distortion that adversely affects the imaging of the low-power optical beam.

To avoid the ionization effect, the intermediate focus may be formed in a vacuum. There is no air to ionize, and the problems discussed above do not arise. However, a vacuum chamber added to an optical system to contain all or a part of the optical system adds weight and complexity to the optical system, may be difficult to maintain in hostile environments to avoid leaks, requires the use of special light-transparent materials in some cases, and may involve a significant transmission loss at the windows of the vacuum system.

There is a need for a better approach to optical systems that avoids such ionization problems. The present invention fulfills this need, and further provides related advantages.

SUMMARY OF THE INVENTION

The present invention provides an optical system with an intermediate focus of the optical beam in air or other gas, but which avoids ionization of the gas by a high-power beam that is focused at the intermediate focus. No vacuum chamber is utilized around the location of the intermediate focus, thereby avoiding the weight, complexity, maintenance difficulties, materials requirements, and transmission loss associated with the presence of the vacuum chamber. The present approach is operable with a single high-power wavelength component of the optical beam, but is more advantageously used where there is both a high-power wavelength component and an imaged low-power wavelength component that are transmitted along the same optical path through the optical system.

In accordance with the invention, an optical system has a light source of an optical beam, and a wavefront distortion generator that introduces a known wavefront distortion into at least one wavelength component of the optical beam prior to the formation of an intermediate image. A focusing device receives the optical beam, produces the intermediate image of the optical beam, and outputs the optical beam. An example of a focusing device is an three-mirror anastigmat. After the formation of the intermediate image, a wavefront distortion corrector introduces a wavefront distortion correction into each component of the optical beam into which the known wavefront distortion was introduced by the wavefront distortion generator. The wavefront distortion correction is the reverse of the known wavefront distortion introduced into the optical beam by the wavefront distortion generator. The wavefront distortion generator and the wavefront distortion corrector may each be a reflective optical element or a refractive optical element. The wavefront distortion generator and the wavefront distortion corrector may be separate from the focusing device, or at least one of the wavefront distortion generator and the wavefront distortion corrector may be integral with the focusing device.

In one embodiment, the optical beam has exactly one wavelength component, the wavefront distortion generator introduces the known wavefront distortion into the exactly one wavelength component, and the wavefront distortion corrector introduces the wavefront distortion correction into the exactly one wavelength component. In another embodiment, the optical beam has a first wavelength component and a second wavelength component, the wavefront distortion generator introduces the known wavefront distortion into the first wavelength component but not the second wavelength component, and the wavefront distortion corrector introduces the wavefront distortion correction into the first wavelength component but not the second wavelength component. In this second embodiment, the first wavelength component and the second wavelength component may be propagated in the same direction, or they may be propagated in opposite directions through the optical system.

A method of processing an optical beam comprises the steps of supplying the optical beam, thereafter introducing a known wavefront distortion into a least one wavelength component of the optical beam to form a distorted optical beam, thereafter forming an intermediate image of the distorted optical beam, and thereafter introducing a wavefront distortion correction into each wavelength component of the optical beam into which the known wavefront distortion was introduced. The wavefront distortion correction is the reverse of the known wavefront distortion introduced into the optical beam. This method may be applied to an optical beam having a single wavelength component, or to an optical beam having more than one wavelength component, as described earlier.

The present approach avoids the formation of a high-power-density intermediate image by distorting or aberrating the optical beam prior to its reaching the location of the intermediate image, and then correcting the wavefront distortion of the optical beam after it passes the location of the intermediate image. The wavefront distortion generator for the introduction of a controlled, known wavefront distortion may be designed using conventional optical design techniques. The tracing of the distorted optical beam through the location of the intermediate image allows the power density of the distorted optical beam at that location to be determined, and the required wavefront distortion is selected so that the power density is below that which will ionize the gas present at the location of the intermediate image. Because the wavefront distortion is known from the design parameters, the corresponding reverse wavefront distortion correction may also be readily designed into the wavefront distortion corrector. The wavefront distortion generator and the wavefront distortion corrector are configured to distort the optical beam inversely to each other, and they therefore operate equally well on optical beam wavelength components propagated in the same direction or optical beam wavelength components propagated in opposite directions.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a depiction of focusing device;

FIG. 2 is a block diagram of an optical system utilizing the present invention;

FIG. 6 is a schematic depiction of a third embodiment of the optical system of FIG. 2;

FIG. 7 is a schematic depiction of a fourth embodiment of the optical system of FIG. 2;

DETAILED DESCRIPTION OF THE INVENTION

Figure 3:
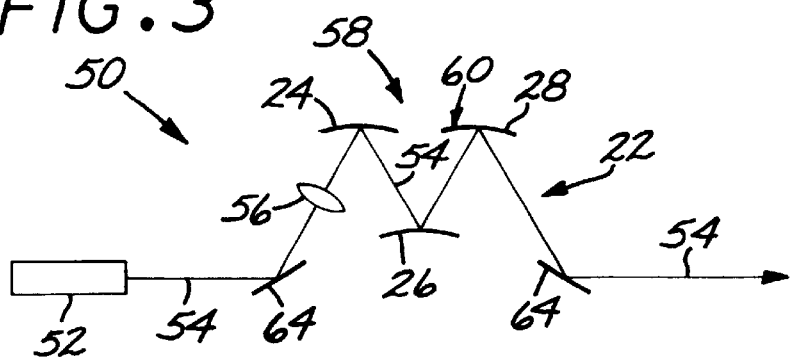
FIG. 3 is a schematic depiction of a first embodiment of the optical system of FIG. 2.

FIG. 1 depicts a prior optical system 20 having a focusing device in the form of a three-mirror anastigmat 22. The three-mirror anastigmat 22 includes a primary mirror 24, a secondary mirror 26, and a tertiary mirror 28. An optical beam 30 passes through the three-mirror anastigmat 22 in either direction. The three-mirror anastigmat 22 focuses the optical beam 30 at an intermediate image 32 located between the secondary mirror 26 and the tertiary mirror 28. If the optical beam 30 is or includes a high-power beam such as a high-power laser beam, the power density of the optical beam 30 at the location of the intermediate image 32 may be so high that the air or other gas at that location is ionized. The ionized gas distorts the optical beam in an uncontrolled manner, interfering with the optical performance of the optical system at other locations.

To prevent this uncontrolled wavefront distortion where such a focusing device must be used, it has been the prior practice to remove the ionizable gas from the location of the intermediate image 32, using a vacuum system 34. The vacuum system 34 includes a vacuum chamber 36 that is evacuated by a vacuum pump 38, and windows 40 and 42 so transmit the optical beam 30 into and out of the vacuum chamber 36. In this case, the vacuum system is illustrated as enclosing the entire three-mirror anastigmat 22, but it may instead be configured to enclose only the location of the intermediate image 32. While operable and suitable for some applications, the use of the vacuum system 34 increases the weight, complexity, and cost of the optical system 20. The maintenance of the vacuum system 34 with its pump and seals to ensure a vacuum when the optical system 20 is to be used is a continuing concern. Additionally, the vacuum system 34 requires special materials for the windows 40 and 42, and the presence of the windows 40 and 42 attenuates the optical beam 30 and may lead to unacceptable system heating. The problems with the formation of an intermediate image of a high-power optical beam have been illustrated in terms of the three-mirror anastigmat 22 as the focusing device, but the same problems arise in other types of optical systems that form such an intermediate image of a high-power optical beam.

FIG. 2 illustrates an optical system 50 according to the invention that overcomes these problems and eliminates the need for the vacuum system. The optical system 50 includes a light source 52 for each wavelength component of an optical beam 54. A wavefront distortion generator 56 introduces a known wavefront distortion (i.e., an aberration of the light wavefront) into at least one wavelength component of the optical beam prior 54 to the formation of an intermediate image. A focusing device 58 receives the optical beam 54, produces the intermediate image of the optical beam 54, and outputs the optical beam 54 (As used herein, "intermediate image" includes an intermediate image or other intermediate spatially focused or concentrated portion of the optical beam where the local beam power density is increased over its value at a remote location, other than a final image or focus of the beam. Such intermediate images often occur in optical systems.) After the formation of the intermediate image in the focusing device 58, a wavefront distortion corrector 60 introduces a wavefront distortion correction into each component of the optical beam 54 into which the known wavefront distortion was introduced by the wavefront distortion generator 56. The wavefront distortion correction is the reverse of the known wavefront distortion introduced into the optical beam 54 by the wavefront distortion generator 56.

The nature and magnitude of the known wavefront distortion are selected to spoil the intermediate image sufficiently that the optical power density of the optical beam 54 at all locations within and near the location of the intermediate image is below that required to ionize air or other gas present at the location of the intermediate image. This calculation is readily made by optics programs such as the CODEV™ program, which are known in the art for other purposes. These programs allow the tracing of ray paths and the calculation of the optical power density at each location along the beam path, including at the location of the intermediate image. The result of introducing the known wavefront distortion is that the air or other gas at the location of the intermediate image is not ionized, and therefore no vacuum system is needed. The nature and magnitude of the wavefront distortion introduced by the wavefront distortion generator 56 are known design parameters, and therefore the same design parameters are used, except inversely, to design the wavefront distortion corrector 60. Consequently, the optical beam leaving the wavefront distortion corrector 60 is free of the optical wavefront distortion introduced at the wavefront distortion generator 56. Because the optical path through the optical system 50 is reciprocal in nature, light may propagate along a ray path in either direction through the optical system 50 and enjoy the benefits of the present approach.

The general approach of FIG. 2 may be implemented in a number of ways, and FIGS. 3–8 illustrate some of these ways. These examples are depicted in relation to the three-mirror anastigmat as the focusing device 58, but their depictions of wavefront distortion generators and wavefront distortion correctors are equally applicable to other types of focusing devices that produce an intermediate image (i.e., an image or other focused or concentrated region of the beam that is not the final image on a sensor or other device). In these examples, numbers of common elements are assigned the same reference numerals, and the other discussion is incorporated into the discussion of each example as appropriate. Only a single ray path is shown in the overall drawings such as FIGS. 3, 5, 6, 7, and 8, to avoid clutter. Features of the various embodiments may be used consistently in other combinations with each other.

Figure 4:
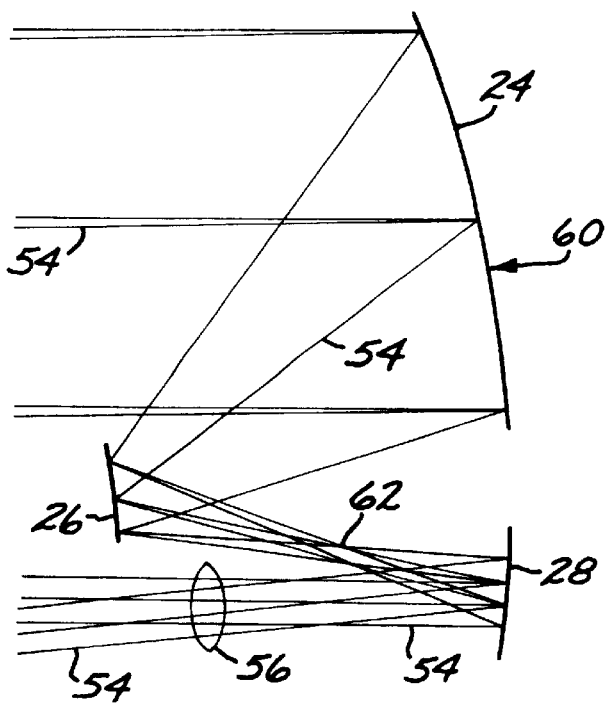
FIG. 4 is a depiction of the focusing device of FIG. 1, but incorporating the approach of FIGS. 2 and 3.

In FIG. 3, the wavefront distortion generator 56 is a refractive lens placed at the entrance pupil of the three-mirror anastigmat 22 that serves as the focusing device 58. The refractive lens wavefront distortion generator 56 is a lens made of a material that is transparent to the wavelengths in the light beam 54. The entry side of the lens may be flat, and the exit side may have an aspheric surface of a shape designed to impart the desired aberration to the light beam. FIG. 4 shows this arrangement in more detail. The refractive wavefront distortion generator 56 is placed at the entrance pupil of the three-mirror anastigmat 22 to controllably distort the optical beam 54 so that an intermediate focus 62 is aberrated to a large spot size with a low optical power density rather than a very small spot size with a high optical power density. The refractive wavefront distortion generator 56 is designed so that the aberration at the aberrated intermediate focus 62 is sufficient that the gas at that location is not ionized. The known wavefront distortion is reflectively corrected in this case at the reflection from the primary mirror 24, which serves as the wavefront distortion corrector 60, of the three-mirror anastigmat 22. The primary mirror is designed to introduce the required wavefront distortion correction that is the reverse of the wavefront distortion introduced by the lens distortion generator 56. This embodiment has the advantage that it is applicable to the light beam 54 having a wide spectral band and a wide field of view. In this case, the wavefront distortion generator 56 and the wavefront distortion corrector 60 are integral with the focusing device 58. Returning to FIG. 3, fold mirrors 64 in this case are simple reflective mirrors that do not introduce any wavefront distortions into the reflected optical beam 54.

Figure 5:
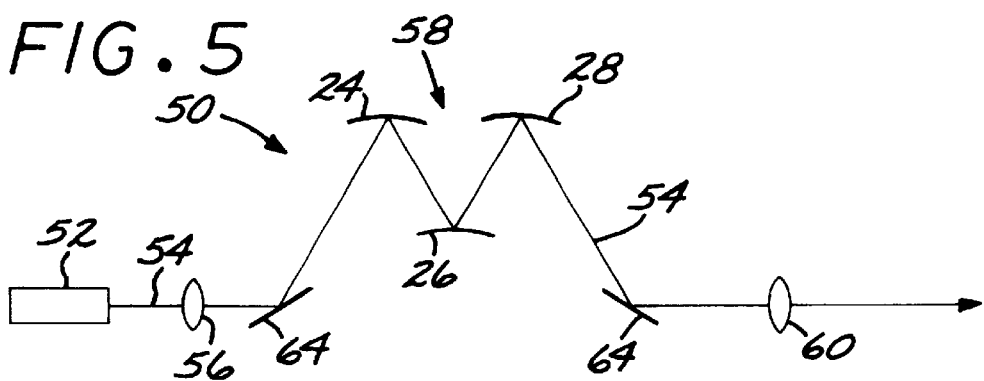
FIG. 5 is a schematic depiction of a second embodiment of the optical system of FIG. 2.

The wavefront distortion generator 56 of FIG. 5 has a refractive lens wavefront distortion generator 56 and a refractive lens wavefront distortion corrector 60, each of which is not integral with the focusing device 58. The refractive lens wavefront distortion corrector 60 has the aspheric surface shaped with the reverse of the aberration introduced by the refractive lens of the wavefront distortion generator 56. A reflective wavefront distortion generator 56 or a diffractive wavefront distortion generator 56 may be used instead of the refractive wavefront distortion generator 58 in this and other embodiments where operable. A reflective wavefront distortion corrector 60 or a diffractive wavefront distortion corrector 60 may be used instead of the refractive wavefront distortion corrector 60 in this and other embodiments where operable.

The embodiment of FIG. 6 illustrates reciprocal light beams 54 of two different wavelengths $\lambda_1$, and $\lambda_2$ that pass through the focusing device 58 on the same beam ray path but in opposite directions. The source 52 is the source of a light beam 54a of a first wavelength component $\lambda_1$ that propagates from left to right in the view of FIG. 6 A source (not shown, but typically another optical component that receives the light from a viewed scene) external to the optical 30 system 50 is the source of a light beam 54b of a second wavelength component $\lambda_2$ that propagates from right to left in the view of FIG. 6. The light beam 54a passes through a wavelength-selective mirror 66, while the light beam 54b is reflected from the wavelength-selective mirror 66 to a detector 68. The light beam 54a having the wavelength component $\lambda_1$ passes through the refractive wavefront distortion generator 56, through the focusing device 58, and through the refractive wavefront distortion corrector 60. The light beam 54b having the wavelength component $\lambda_2$ enters from the right, passes through the wavefront distortion corrector 60 (which for the light beam 54b actually serves to introduce the wavefront distortion into the light beam 54b), passes through the focusing device 58 in the opposite direction to the passage of the light beam 54a, passes through the refractive wavefront distortion generator 56 (which for the light beam 54b actually serves to correct the wavefront distortion in the light beam 54b), is reflected by the wavelength-selective mirror 66, and is received by the detector 68. This ability of the optical system 50 to process oppositely traveling light beams 54a and 54b arises from the reverse nature of the optical system, particularly the components 56 and 60.

FIG. 7 depicts an optical system 50 in which only the first wavelength component 54a is distorted and corrected. The first wavelength component 54a passes through the refractive optical corrector 56 from left to right, through the wavelength selective mirror 66, and through the focusing device 58. It then reflects from a selective wavefront distortion corrector 70, which serves as the wavefront distortion corrector 60 for the first wavelength component 54a by correcting the wavefront distortion in the first wavelength component 54a, but has no effect on the second wavelength component 54b other than to reflect it. The second wavelength component 54b, traveling from right to left, reflects from the selective wavefront distortion corrector 70 without having any wavefront distortion introduced, passes through the focusing device 58, and reflects from the wavelength-selective mirror 66 and to the detector 68 (without passing through component 56). Thus, in the embodiment of the optical system 50 of FIG. 7, only the light beam 54a is distorted and corrected prior to passing through the focusing device 58, and no wavefront distortion/correction is introduced into the light beam 54b. This selectivity is appropriate, because in this example the light beam 54a of wavelength $\lambda_1$ is a high-power laser beam, such as at 1.06 micrometers wavelength, while the light beam 54b of wavelength $\lambda_2$ is a low-power beam of visible, near-infrared, mid-infrared, and/or far-infrared wavelength. Only the high-power light beam 54a can cause the ionization in the focusing device 58 if not wavefront distorted. The embodiments of FIGS. 6 and 7 differ in that the embodiment of FIG. 6 distorts and corrects light of all wavelength components, while the embodiment of FIG. 7 distorts and corrects only the wavelength component (light beam 54a) of sufficiently high optical energy density to ionize gas at the intermediate focus in the focusing device 58.

Figure 8:
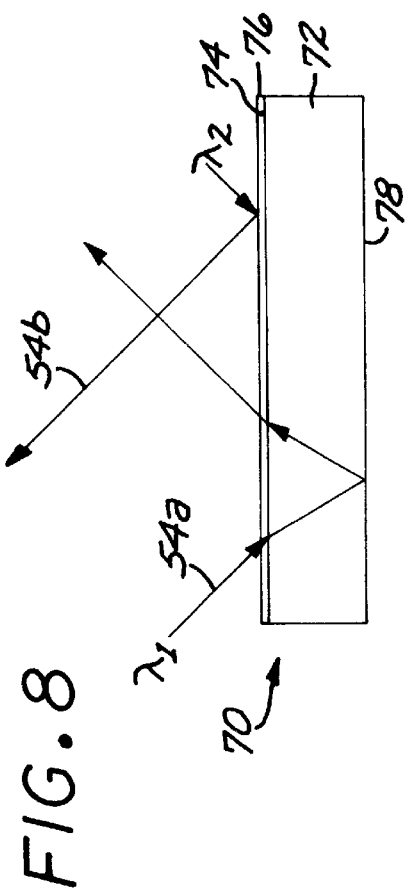
FIG. 8 is a schematic elevational view of a reflective wavefront distortion corrector.

One form of the selective wavefront distortion corrector 70 of FIG. 7 is illustrated in FIG. 8. A piece of transparent glass 72 (or other transparent material) has a multi-layer thin film 74 such as a Rugate filter applied to its distortion-free front surface 74. The multi-layer thin film 76 is designed to reflect light of wavelength $\lambda_2$ but transmit light of wavelength $\lambda_1$. Such multi-layer thin films 76 are widely used for other purposes, such as anti-reflective coatings. The light beam 54b therefore reflects from the selective wavefront distortion corrector 70 without any wavefront distortion. That is, for the light beam 54b the selective wavefront distortion corrector 70 serves only as a fold mirror. The light beam 54a passes through the multi-layer thin film 76 and reflects from its back surface 78. The back surface 78 has the reverse of the wavefront distortion that was introduced into the light beam 54a at the refractive wavefront distortion generator 56 of FIG. 7. After reflection from the wavefront distortion-correcting back surface 78, the light beam 54a again passes through the multi-layer thin film 76. The selective wavefront distortion corrector 70 thus introduces the required wavefront distortion correction into the light beam 54a, but does not introduce any wavefront distortion into the light beam 54b.

Figure 9:
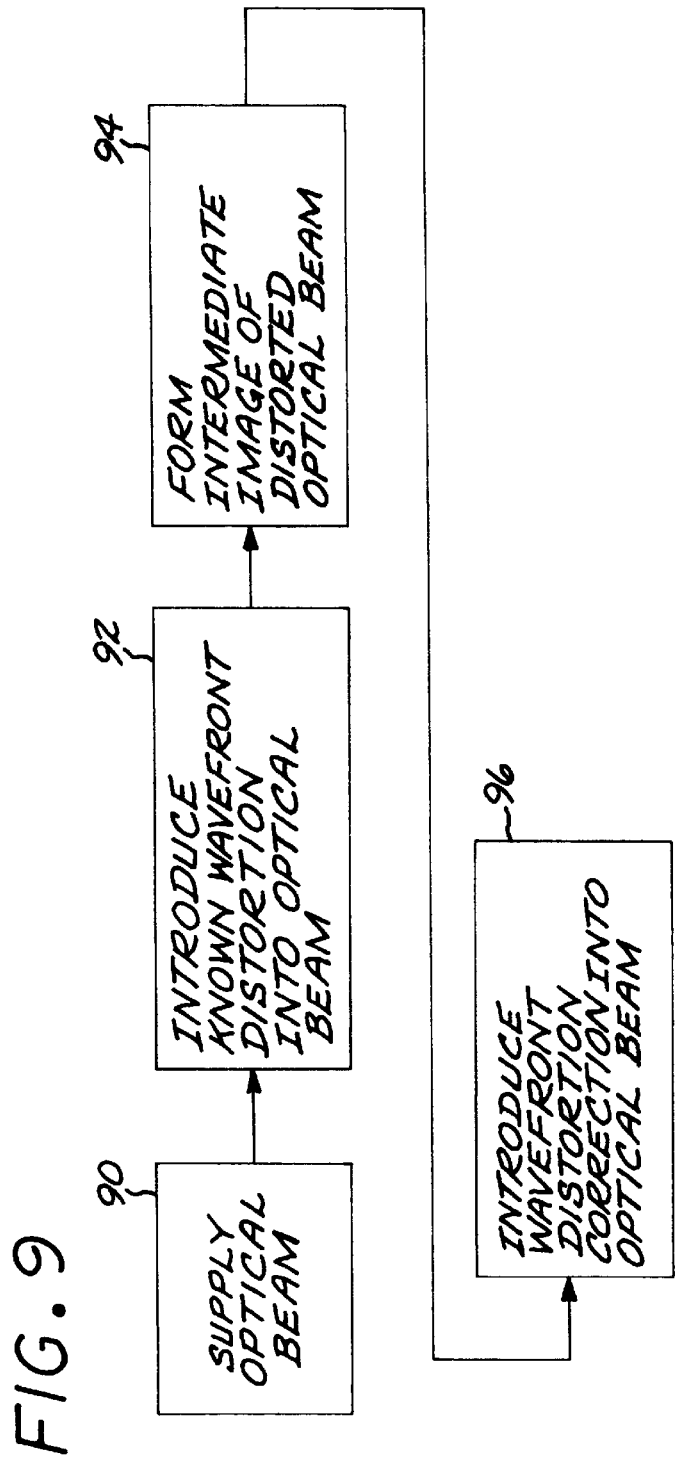
FIG. 9 is a block flow diagram of a method for practicing the invention.

FIG. 9 depicts a preferred approach for practicing the method of the invention. The method includes supplying the optical beam 54, numeral 90. A known wavefront distortion is thereafter introduced into a least one wavelength component of the optical beam 54 to form a distorted optical beam, numeral 92. An intermediate image of the distorted optical beam is thereafter formed, numeral 94. A wavefront distortion correction is thereafter introduced into each wavelength of the optical beam into which the known wavefront distortion was introduced, numeral 96. The wavefront distortion correction is the reverse of the known wavefront distortion introduced into the optical beam. These steps may be practiced with any of the embodiments of the optical system 50 discussed herein, or any other operable optical system.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An optical system comprising:
   a light source for a first wavelength component and a second wavelength component of an optical beam;
   a wavefront distortion generator that introduces a known wavefront distortion into the first wavelength component but not the second wavelength component of the optical beam prior to the formation of an intermediate image;
   a focusing device that receives the optical beam, produces the intermediate image of the optical beam, and outputs the optical beam; and
   a wavefront distortion corrector that, after the formation of the intermediate image, introduces a wavefront distortion correction into the first wavelength component but not the second wavelength component, the wavefront distortion correction being the reverse of the known wavefront distortion introduced into the optical beam by the wavefront distortion generator.

2. The optical system of claim 1, wherein the first wavelength component and the second wavelength component are propagated in the same direction.

3. The optical system of claim 1, wherein the first wavelength component and the second wavelength component are propagated in opposite directions.

4. The optical system of claim 1, wherein the focusing device is a three-mirror anastigmat.

5. The optical system of claim 1, wherein the wavefront distortion generator is a reflective optical element.

6. The optical system of claim 1, wherein the wavefront distortion corrector is a reflective optical element.

7. The optical system of claim 1, wherein the wavefront distortion generator is a refractive optical element.

8. The optical system of claim 1, wherein wavefront distortion generator is a diffractive optical element.

9. The optical system of claim 1, wherein wavefront distortion corrector is a refractive optical element.

10. The optical system of claim 1, wherein wavefront distortion corrector is a diffractive optical element.

11. The optical system of claim 1, wherein the wavefront distortion generator and the wavefront distortion corrector are separate from the focusing device.

12. The optical system of claim 1, wherein at least one of the wavefront distortion generator and the wavefront distortion corrector is integral with the focusing device.

13. The optical system of claim 1, wherein
   the first wavelength component of the optical beam has a beam power density sufficient to ionize a gas at a location of the intermediate image in the absence of the known wavefront distortion, and
   wherein the wavefront distortion generator introduces the known wavefront distortion to produce a distorted beam power density at the location of the intermediate image that is less than that which will ionize the gas present at the location of the intermediate image.

14. A method of processing an optical beam, comprising the steps of
   supplying the optical beam; thereafter
   introducing a known wavefront distortion into a least one wavelength component of the optical beam to form a distorted optical beam; thereafter
   forming an intermediate image of the distorted optical beam; and thereafter
   introducing a wavefront distortion correction into each wavelength component of the optical beam into which the known wavefront distortion was introduced, the wavefront distortion correction being the reverse of the known wavefront distortion introduced into the optical beam,
   wherein an undistorted beam power density of the optical beam is sufficient to ionize a gas present at a location of the intermediate image in the absence of the known wavefront distortion, and wherein the step of introducing a known wavefront distortion includes the step of selecting the known wavefront distortion to produce a distorted beam power density at the location of the intermediate image that is less than that which will ionize the gas present at the location of the intermediate image.

15. An optical system comprising:
   a light source for each wavelength component of an optical beam;
   a wavefront distortion generator that introduces a known wavefront distortion into at least one wavelength component of the optical beam prior to the formation of an intermediate image;
   a focusing device that receives the optical beam, produces the intermediate image of the optical beam, and outputs the optical beam; and
   a wavefront distortion corrector that, after the formation of the intermediate image, introduces a wavefront distortion correction into each component of the optical beam into which the known wavefront distortion was introduced by the wavefront distortion generator, wherein the wavefront distortion correction is the reverse of the known wavefront distortion introduced into the optical beam by the wavefront distortion generator, wherein
   an undistorted beam power density of a wavelength component of the optical beam is sufficient to ionize a gas at a location of the intermediate image in the absence of the wavefront distortion generator, and the wavefront distortion introduced by the wavefront distortion generator produces a distorted beam power density of the wavelength component at the location of the intermediate image that is less than that which will ionize the gas present at the location of the intermediate image.

16. The optical system of claim 15, wherein the focusing device is a three-mirror anastigmat.

* * * * *